United States Patent [19]
Cherry et al.

[11] 4,433,719
[45] Feb. 28, 1984

[54] PORTABLE, REMOTE ENVIRONMENTAL CONTROL SYSTEM

[75] Inventors: Raymond L. Cherry, King County, Wash.; Gene F. Pfeiffer, Lewis and Clark County, Mont.; Randell P. Maes, King County, Wash.

[73] Assignee: TASA Products Limited, Seattle, Wash.

[21] Appl. No.: 357,293

[22] Filed: Mar. 11, 1982

[51] Int. Cl.³ .............................................. G05D 23/00
[52] U.S. Cl. ...................................... 165/26; 236/51; 340/825.57
[58] Field of Search ................. 236/46 R, 51; 165/26; 340/825, 57, 825.69, 825.64, 825.65

[56] References Cited

U.S. PATENT DOCUMENTS

| | | | |
|---|---|---|---|
| 3,159,212 | 12/1964 | Patrick | 165/26 |
| 3,605,877 | 9/1971 | Issaacs et al. | 165/26 |
| 4,235,368 | 11/1980 | Neel | 236/46 R |
| 4,360,881 | 11/1982 | Martinson | 340/825.69 |

*Primary Examiner*—William E. Wayner
*Attorney, Agent, or Firm*—Seed and Berry

[57] ABSTRACT

A portable thermostat is coupled to the control unit of a heating or cooling device through a radio link. The RF signal transmitted by the thermostat is encoded and then decoded by the control unit in order to prevent interference with other similar devices. In order to maximize the life of a battery powering the thermostat, the thermostat calls for the energization of a heating or cooling device by transmitting the RF signal at widely spaced intervals. The heating or cooling device is energized by shunting a pair of terminals, thereby completing an AC control loop. The control unit applies the terminals to a storage capacitor during a small portion of each AC cycle to power the control unit while shunting the terminals during the remaining part of the cycle.

19 Claims, 6 Drawing Figures

PORTABLE, REMOTE ENVIRONMENTAL CONTROL SYSTEM

DESCRIPTION

TECHNICAL FIELD

This invention relates to environmental control systems, such as heating and cooling devices, and, more particularly, to a system utilizing a portable sensor for regulating an environmental condition in one of several areas that have their environments controlled by a remote environmental control unit.

BACKGROUND ART

Environmental conditions such as temperature or humidity are generally controlled or affected in buildings by a single environmental control unit, such as a furnace or an air conditioner. The operation of the environmental control unit is regulated through a closed-loop feedback control system in which a sensory device senses the environmental condition in a particular area, compares the environmental condition to a preset value, and energizes the environmental control device when the sensed environmental condition is less than the reference value. For simplicity of explanation, the preferred embodiment is explained with reference to the environmental condition being temperature. However, it will be understood that the principal of the invention is applicable to any other environmental condition.

In a conventional heating or cooling system, a thermostat is mounted in a room which is heated and/or cooled by a central furnace or air conditioner. A system of this type is capable of accurately regulating the temperature in the room in which the thermostat is located. However, it is incapable of accurately regulating the temperature in other rooms that are heated and/or cooled by the furnace or air conditioner since these other rooms may be subject to different heat losses or gains. Also, the coupling from the furnace or air conditioner to each room may vary so that operation of the furnace or air conditioner to maintain the temperature constant in the room in which the thermostat is located may have greater or lesser effects in other rooms.

The inability to adequately regulate the temperature in rooms other than the rooms in which the thermostat is located presents the greatest problem when the coupling to the room in which the thermostat is located varies. In the most serious case, one may wish to prevent the heating or cooling device from heating or cooling the room in which the thermostat is located when such room is not being used. However, doing so virtually breaks the feedback path controlling the operation of the heating or cooling system. This is because the heating or cooling device will have little, if any, effect on the temperature in the room in which the thermostat is located.

The key to solving the above-described problem is to reposition the thermostat from room to room, depending upon which rooms are either occupied or closed off from time to time. However, existing thermostats are connected to the heating or cooling device by wires, thereby precluding easy portability. Although the use of a radio link as a substitute for the wires may appear possible, problems associated with the expense of a radio link, the difficulty in providing a link which does not interfere with other such radio links, and the high power consumption of a radio link appear formidable.

Another, somewhat different problem associated with thermostats for heating and cooling devices stems from the need to supply power to some thermostats through lines which, of necessity, are shunted when the heating and cooling device is energized. For example, many thermostats include an internal timer for disabling the heating or cooling system during certain portions of the day or evening. These timers are conventionally powered by the AC signal on the control lines when the lines are not shunted. Most gas, electric and oil furnaces as well as central air conditioners are controlled through a pair of terminals which receive a relatively low-voltage AC signal. An energizing relay is connected in series with the terminals so that it is actuated by shunting the terminals with a relatively low-impedance circuit element, such as a switch. Shunting these terminals reduces the voltage thereacross to zero so that the thermostat is incapable of receiving power through the terminals when it is energizing the heating or cooling device. Consequently, existing thermostats are powered by either a separate power supply or, most commonly, an energy storage device, such as a battery, charged by the AC signal when the terminals are not shunted. The energy storage then supplies power to the thermostat when it is shunting the terminals to energize the heating or cooling device. This latter approach is satisfactory as long as the energy storage device is capable of storing sufficient energy during the "off" time of the heating or cooling device to last through the "on" times. With a relatively high ratio of "on" to "off" time, this is not always possible. Moreover, the problem cannot be solved by merely storing energy at a faster rate since the increased current flow into the energy storage device might energize the relay controlling the heating and cooling device.

DISCLOSURE OF INVENTION

It is an object of the invention to provide a portable system for regulating an environmental condition in one of several areas which are controlled by a remotely located environmental control unit.

It is another object of the invention to provide a system of the character described which utilizes a coded radio link for conveying information from a remote sensing unit in the area to be regulated to a receiver unit operating the environmental control unit.

It is still another object of the invention to provide a remote sensing device which operates an environmental control unit through a radio link having a relatively low duty cycle in order to minimize the power consumption of the sensing device.

It is a further object of the invention to provide a circuit for operating an environmental control unit by apply a low-impedance shunt between a pair of terminals on which an AC signal is present while allowing the circuit to be powered by the AC signal.

These and other objects of the invention are provided by a system for operating an environmental control unit, such as a heating or cooling device, which regulates the environmental condition at a remote location. The system includes a transmitter unit which senses the environmental condition and compares it to a target value. The transmitter unit then transmits an RF signal when the sensed value is less than the target value in a heating more or greater than the target value in a cooling mode. The RF signal propagates to a receiver unit which actuates the environmental control unit responsive to receipt of the RF signal. The RF signal is preferably modulated by a code to prevent the transmitter from actuating the receiver units of other radios and to prevent the receiver from responding to spurious radio signals. In order to minimize the power consumption of the transmitter, the transmitter operates with a relatively low duty cycle. Each time the RF signal is generated by the transmitter, a timer unit in the receiver is triggered to energize the environmental contol unit for a predetermined period which is longer than the interval between subsequent transmissions from the transmitter. As a result, the environmental control unit is continuously energized even though the duty cycle of the transmitter is relatively low. The environmental control unit is typically actuated by connecting a low-impedance shunt between a pair of terminals that are connected to a low-voltage AC signal. In order to allow the receiver unit to be powered through these terminals, an energy storage device is connected in series with the terminals through a rectifier and second switch. A control circuit measures the energy stored in the energy storage device and prevents the terminals from being shunted until the stored energy reaches a predetermined value each cycle. After "steady-state" conditions have been reached, the terminals are open for only a relatively small part of each AC signal. Consequently, the average impedance across the terminals is sufficiently low to energize the environmental control unit. Although a variety of energy storage devices may be used, the energy storage device is preferably a capacitor. The voltage across the capacitor is compared to a reference voltage and, when the reference voltage is exceeded, the terminals are shunted, with the rectifier then isolating the capacitor from the terminals. The relatively low power consumption resulting from the relatively low duty cycle of the radio maximizes the life of the battery powering the transmitter.

BEST MODE FOR CARRYING OUT THE INVENTION

Figure 1:
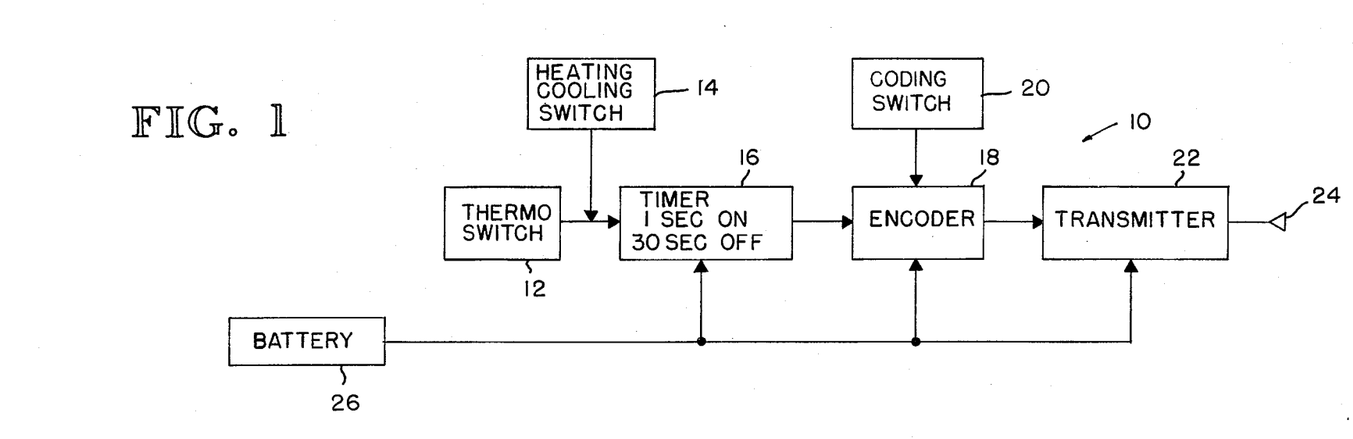
FIG. 1 is a block diagram of a portable, temperature-sensing transmitter of the present invention.

The temperature-sensing transmitter unit 10, as illustrated in block diagram form in FIG. 1, includes a thermo-sensing switch 12 of conventional variety, such as a coiled bimetallic strip. When a heating/cooling switch 14 is in the heating position, the switch is closed when the sensed temperature is lower than the target temperature, thus indicating the need for additional heat. The switch 12 includes a mechanism for selecting a desired or target temperature. When the heating/cooling switch 14 is in the cooling position, the thermo-sensing switch 12 is closed when the sensed temperature is above the target temperature, thus indicating the need for additional cooling. In either case, closure of the thermos-sensing switch 12 actuates a timer 16 which generates an output of approximately one second during every thirty seconds. The duty cycle of the timer is thus one-thirtieth (1/30). The timer 16, in turn, triggers an encoder 18 every thirty seconds, thereby causing the encoder 18 to generate a train of pulses having a predetermined pattern as determined by manually adjustable coding switches 20. The coded pulse train at the output of encoder 18 energizes a conventional RF transmitter 22, which applies an RF signal to an antenna 24. The timer 16, encoder 18, and transmitter 22 are powered by a battery 26 of appropriate voltage.

The transmitter unit 10 thus operates by determining whether additional heat is needed in the heating mode or additional cooling is needed in the cooling mode to attain a target temperature. If so, the transmitter 22 generates a coded RF signal every thirty seconds.

Figure 2:
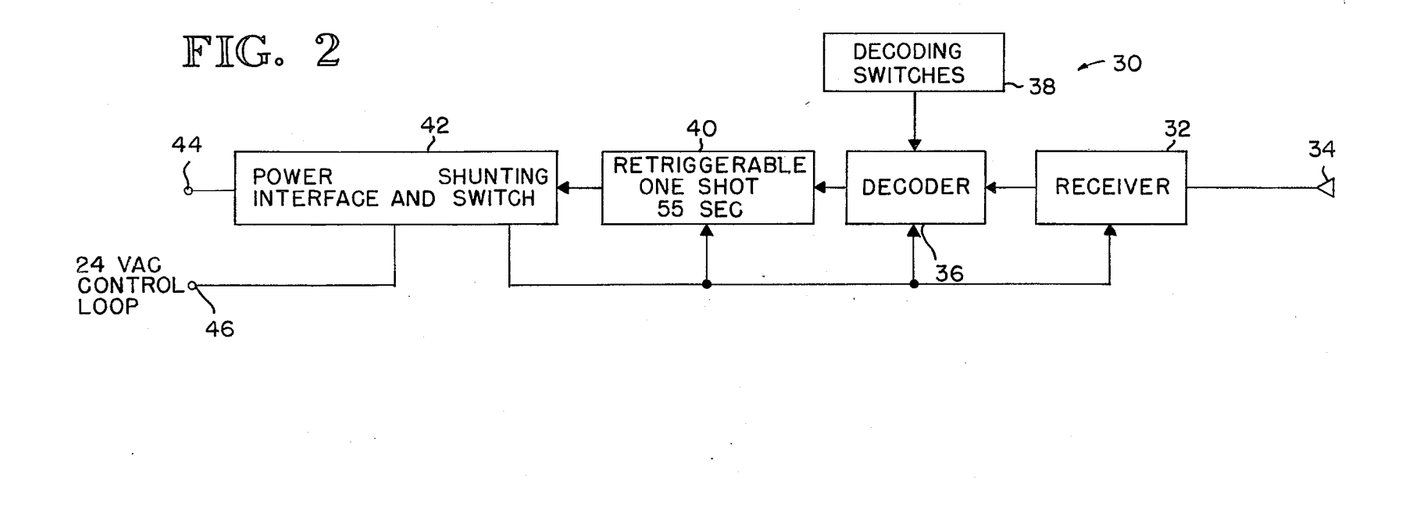
FIG. 2 is a block diagram of a receiver for energizing an environmental control unit responsive to receipt of an RF signal from the transmitter of FIG. 1.

The transmitted RF signal is received and detected by a receiver unit 30 which is connected to the 24-volt AC control loop of a conventional heating or cooling device, such as a furnace or an air conditioner. The receiver unit 30 includes a radio receiver 32 having an RF input connected to an antenna 34. The output of the receiver 32 is the demodulated RF signal applied to the antenna 34, and this demodulated signal is applied to a decoder 36. The decoder 36 is programmed with decoding switches 38 to match the arrangement of the coding switches 20 in the transmitter unit 10. Accordingly, the decoder 36, upon receiving a pulse train corresponding to the pulse train at the output of encoder 18, generates an output which triggers a retriggerable one-shot 40. The duration of the one-shot output 40 is, in the illustrative embodiment, fifty-five seconds. Insofar as the transmitter unit 10, when calling for heating or cooling, generates a coded RF signal every thirty seconds, the one-shot 40 will be retriggered every thirty seconds. Under these conditions, the one-shot 40 generates a continuous output. It will thus be apparent that, although the one-shot 40, illustrated in FIG. 2, is timed to generate an output having a duration of fifty-five seconds, it could be timed to generate an output having any duration larger than thirty seconds since the one-shot 40 is retriggered every thirty seconds when the transmitter is energized.

The output of the retriggerable one-shot 40 is applied to a power interface and shunting switch 42 which is connected to the terminals 44,46 of a 24-volt AC control loop. The terminals 44,46 are normally connected in series with a relay coil that closes a contact to apply power to the heating or cooling device. Thus, placing a low impedance shunt between terminals 44,46 closes the relay to energize the heating or cooling device. However, when the terminals 44,46 are shunted, the voltage applied to the power interface and shunting switch 42 is zero. As a result, the power interface portion of circuit 42 would be unable to receive power required to drive the retriggerable one-shot 40, decoder 36, and receiver 32. As explained in greater detail hereinafter, this problem is solved by connecting the terminals 44,46 to an energy storage device and delaying the closing of a shunting switch across terminals 44,46 until the energy stored in the energy storage device reaches a predetermined value. After steady-state conditions are reached, the impedance between terminals 44,46 is relatively high for only a relatively small part of the initial portion of each AC cycle. Thereafter, the shunting switch is closed for the remainder of the AC cycle. As a result, since the average impedance between the terminals 44,46 is relatively low, the relay switch energizing the heating or cooling device remains closed.

Figure 3:
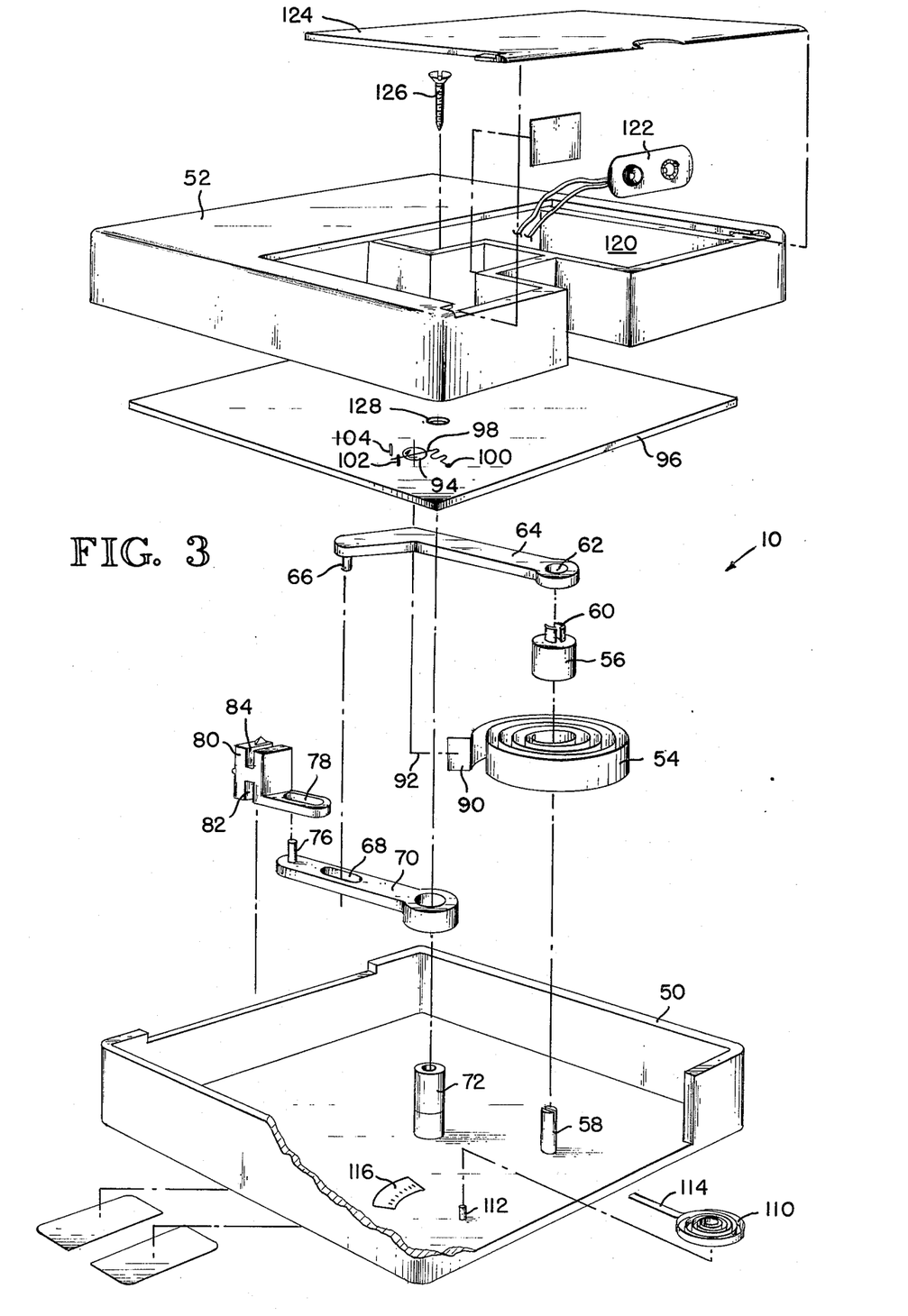
FIG. 3 is an exploded isometric view of the transmitting device of FIG. 1.
Figure 4:
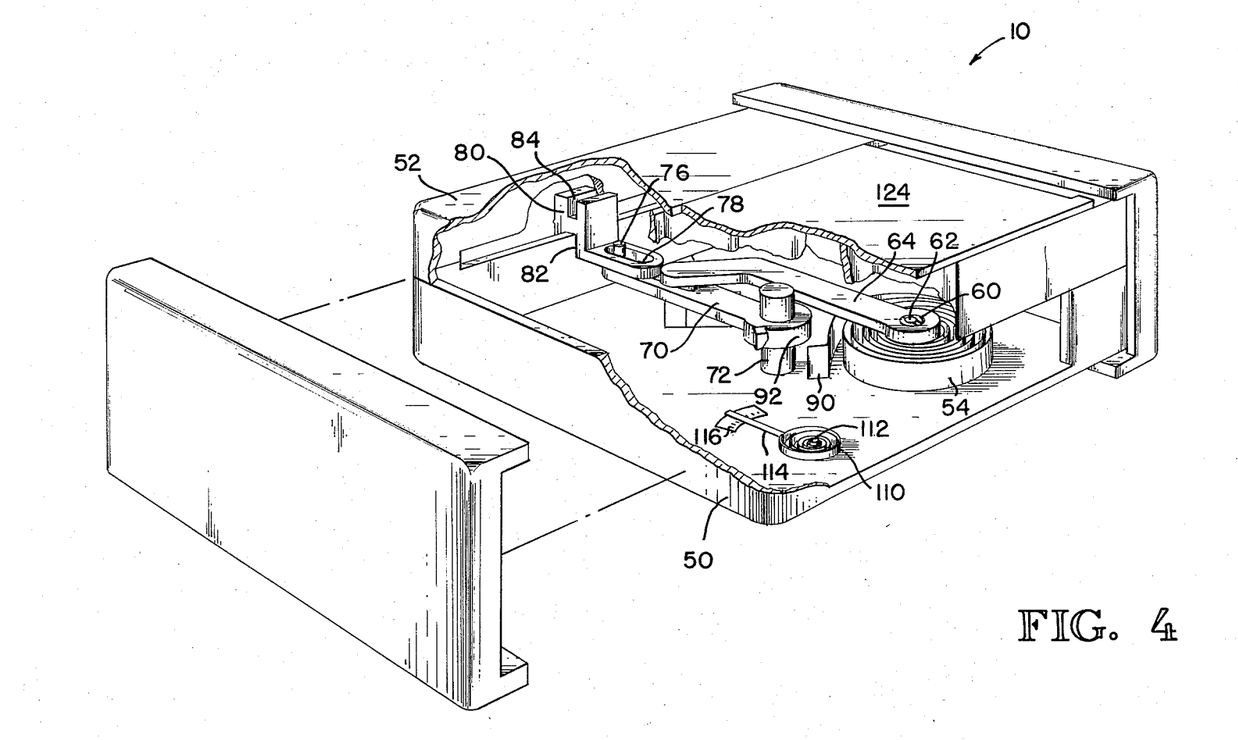
FIG. 4 is an assembled isometric view of the transmitting device shown in FIGS. 1 and 3.

The temperature-sensing transmitting unit 10, as illustrated in FIGS. 3 and 4, includes a lower housing 50 which mates with an upper housing 52. A coiled bimetallic strip 54 is fixedly mounted on a cylindrical boss 56 which is, in turn, slidably mounted on a cylindrical boss 58 projecting upwardly from the inner surface of the lower housing 50. Projecting upwardly from the boss 56 are a pair of semicircular members 60. These members 10 frictionally engage the inner walls of bore 62 formed in lever 64 so that the boss 56 and lever 64 rotate together. Lever 64 terminates in a downwardly depending projection 66 which fits into a slot 68 of lever 70. Lever 70 is pivotally mounted from the lower housing 50 through boss 72. The opposite end of lever 70 includes an upwardly depending projection 76 which fits into a slot 78 of a temperature-setting pointer 80. The pointer 80 has formed therein a pair of opposed slots 82,84 which receive opposite side edges of the lower and upper housings 50,52. In operation, movement of the temperature-setting pointer 80 from one side or the other rotates lever 70, which in turn rotates lever 64. This movement causes the bimetallic strip 54 to rotate, which, as explained hereinafter, determines the temperature at which the bimetallic strip 54 closes a switch contact. The edge of the upper housing 52 adjacent the pointer 80 contains calibrated temperature markings to indicate the set point of the thermostat.

The bimetallic strip 54 terminates in a radially extending flange 90 to which is secured an L-shaped wire 92. The L-shaped wire extends upwardly through an aperture 94 in a printed circuit board 96 in front of a wire 98 secured to the circuit board 96 through contact point 100. The wire 98 follows a serpentine path as it emanates from the contact 100 so that it is highly compliant although it is resiliently biased toward a contact 102. However, since the upwardly depending portion of the L-shaped wire 92 contacts the wire 98 on the side opposite the contact 102, the wire 98 follows the movement of the wire 92. Thus, when the bimetallic strip 54 rotates in a counterclockwise direction, the wire 98 touches contact 102, thereby completing a circuit from contact 100 to contact 102. Rotation of the bimetallic strip 54 in a clockwise direction displaces the wire 98 so that it touches contact 104, thereby completing a circuit from contact 100 to contact 104. As mentioned above, the "set point" or temperature at which the wire 92 causes the wire 98 to touch either contact 102 or contact 104 is adjusted by displacing the pointer 80, thereby rotating the bimetallic strip 54 about boss 58.

A second bimetallic strip 110 mounted on boss 112 terminates in a radially extending pointer 114. The pointer 114 extends across a window 116 containing calibrated temperature markings. The pointer 114 thus provides a visual indication of the ambient temperature. The printed circuit board 96 carries and interconnects all of the circuitry for implementing the block diagram of FIG. 1, as explained in greater detail hereinafter.

The upper housing 52 contains a rectangular recess 120 for housing a battery 26 (FIG. 1, not shown in FIGS. 3 and 4) that is connected to the printed circuit board 96 through a conventional battery clip 122. The battery 26 is held in place by a removable cover 124 that fits into slots in the upper housing 52. The entire unit is held together by a screw 126 which extends through the upper housing 52 into boss 72 through an aperture 128 in the printed circuit board 96.

Figure 6:
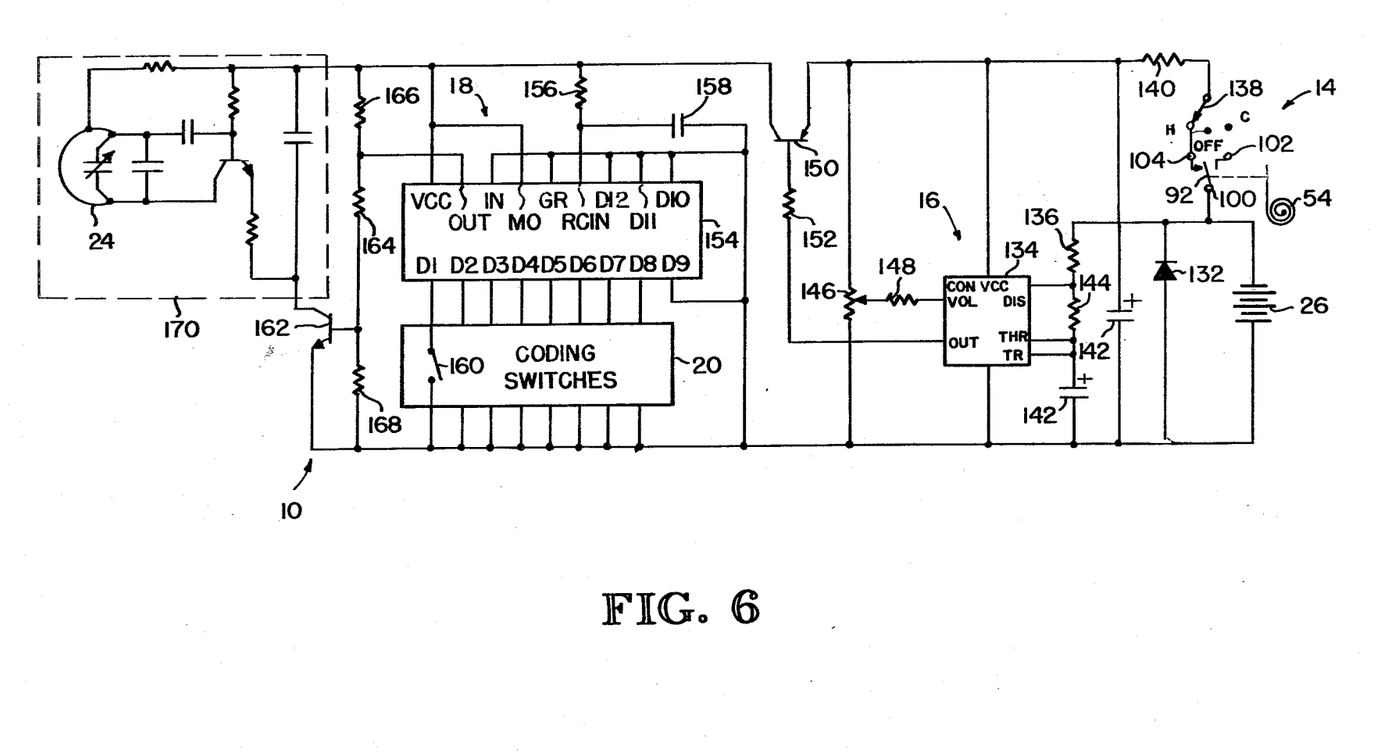
FIG. 6 is a schematic of the temperature-sensing transmitter of FIG. 1.

The circuitry for the transmitter unit 10 is illustrated in schematic form in FIG. 6. As mentioned above, the unit 10 is powered by the battery 26 across which is connected a reverse-biased diode 132 to protect the circuitry in the event that the battery 26 is improperly connected in reverse polarity. The battery 26 is applied to a conventional timing circuit associated with timer 134 through resistor 136 so that the timing circuit is always powered. This is the only circuit that is powered when the transmitter unit is not calling for the heating or cooling device to be energized.

The battery 26 is also applied to contact 100 of the wire 92, which, as explained above, is controlled by movement of the bimetallic strip 54. The function of the transmitter unit 10 as either a heater regulating device or a cooler regulating device is controlled by a switch 138 which also has an "off" position. In the heating mode illustrated in FIG. 6, when the ambient temperature falls below the temperature set by the pointer 80 (FIGS. 3 and 4), the wire 92 makes contact with contact 104, thereby applying power to the power input of timer 134 through resistor 140. The power input of timer 134 quickly rises to the supply voltage since capacitor 142 is only large enough to filter any switch bounce occurring between wire 92 and contact 104. When the power input to timer 134 rises to the battery voltage, timer 134 discharges capacitor 142 through resistor 144 and the "DIS" output to timer 134. After a predetermined interval which, in the embodiment illustrated in FIG. 6, is about one second, capacitor 142 is discharged sufficiently to cause the DIS output to float while the output of the timer 134 goes high. Thereafter, the capacitor 142 charges through resistors 136 and 144. The control voltage (CON VOL) input to the timer 134 also receives a reference voltage from voltage divider potentiometer 146 through resistor 148. When the voltage across capacitor 142 reaches the control voltage at the CON VOL input, the DIS output to timer 134 once again goes low, thereby discharging capacitor 142 through resistor 144. In the embodiment illustrated in FIG. 6, the potentiometer 146 is adjusted so that it requires about thirty seconds for the capacitor 142 to charge up to the voltage at the CON VOL input. The timer 134 continues to operate in this manner as long as the voltage applied to the power input is high. Thus, when wire 92 touches contact 104, thereby calling for the heating device to be energized, the timer 134 repetitively generates an output which goes low for about one second and then remains high for about thirty seconds.

The output of the timer 134 is applied to a transistor switch 150 through resistor 152. When the output of the timer 134 is high during the thirty second interval, the base emitter junction of transistor 150 is back-biased, thereby disconnecting the battery 26 from the remainder of the circuit. However, during the approximately one-second interval that the output of timer 134 is low, transistor 150 conducts, thereby applying the battery voltage to the remainder of the circuit. The battery voltage is then applied to a conventional encoder/decoder circuit 154 available from National Semiconductor. The circuit 154, in its encoding mode, generates a pulse train having a frequency determined by resistor 156 and capacitor 158. The pattern of the pulse train is determined by each of eight switches 160 in the switch bank 20. The output of the encoder 154 is thus an eight-bit pulse train, with each bit having a duration determined by whether the switch 160 corresponding to that bit is closed or open. These pulses are applied to a switching transistor 162 through transistor 164. Pull-up resistor 166 is provided because of the open collector at the output of encoder 154. Resistor 168 is provided to hold transistor 162 off in the presence of a low output from encoder 154.

The collector of switching transistor 162 is connected to the ground line of a conventional RF oscillator 170, which receives power through transistor 150. Thus, when the output of the encoder 154 goes high, thereby causing transistor 162 to saturate, transmitter 170 generates an RF signal which is applied to a short length of conductor on board 96 which acts as the antenna 24. In operation, the transmitter unit 10 thus generates a series of RF bursts having a pattern determined by switches 20 whenever the ambient temperature falls below the set temperature.

When the switch 138 is in the cooling mode, the circuit operates in a similar manner to generate an RF signal whenever the ambient temperature is greater than the set temperature, thereby causing wire 92 to touch contact 102. Finally, in the "off" position, the battery 130 is isolated from the remainder of the circuit by open switch contact 138.

It will be noted that out of every thirty-one seconds, the encoder 154 and transmitter 170 are energized only one second. This low duty cycle causes the circuit to have an extremely low power consumption, thus maximizing the life of the battery 26. The switches 20 may be set in any one of 256 combinations so that the transmitted signal is unlikely to interfere with any other similar system since, as explained above, the switches in the receiver unit must be set to the same combination.

Figure 5:
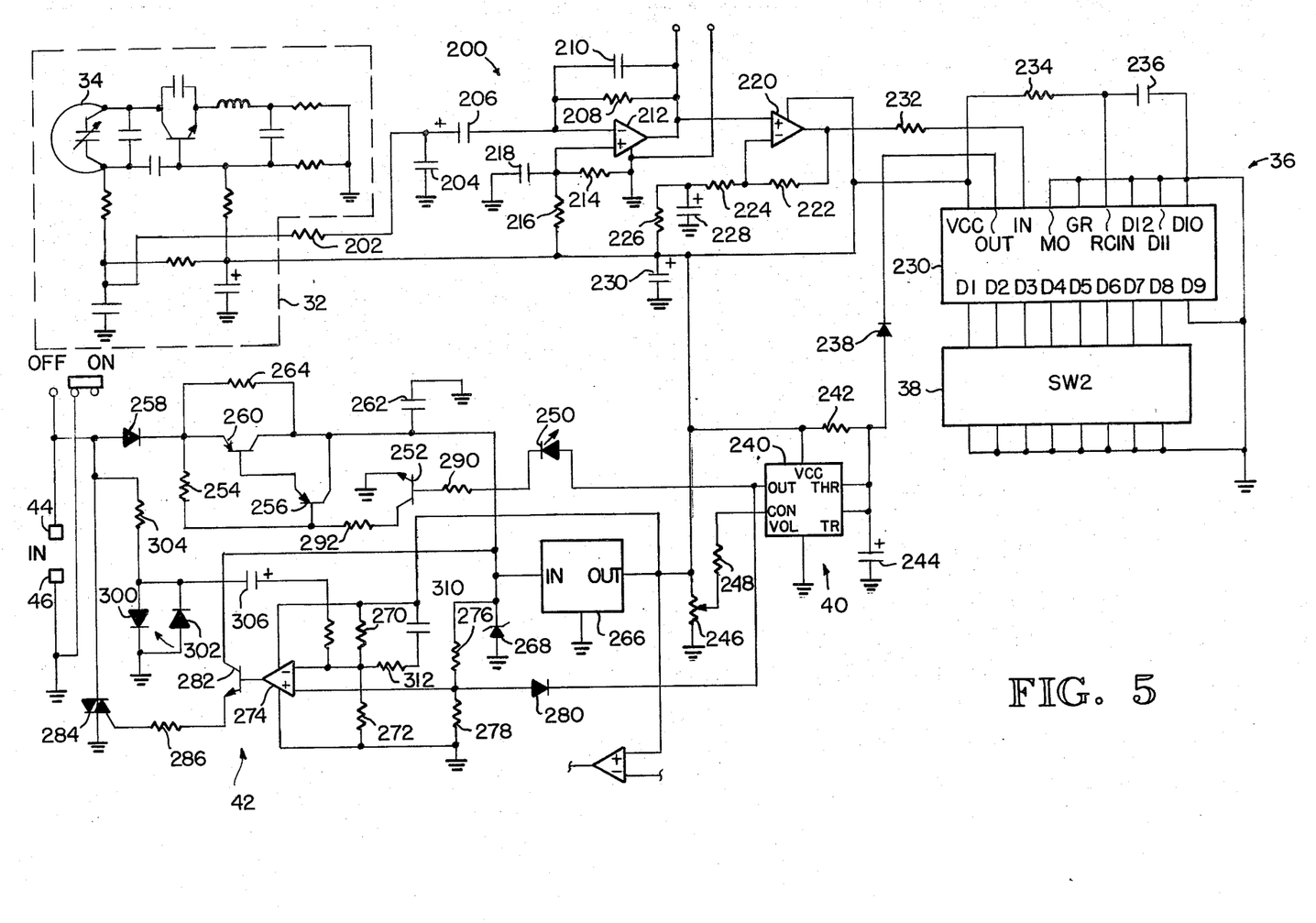
FIG. 5 is a schematic of the receiver of FIG. 2.

The RF signal generated by the transmitter 22 is received by the antenna 34 of a conventional regenerative receiver 32. The output of the receiver 32 is applied to an active filter 200 through a low-pass filter formed by resistor 202 and capacitor 204. Capacitor 206, feedback resistor 208, and feedback capacitor 210 determine the gain and frequency response of operational amplifier 212. Voltage divider resistors 214,216 bias the noninverting input to amplifier 212 while capacitor 218 makes the noninverting input an AC ground. Resistors 214,216 thus bias the input of the filter 200. The output of amplifier 212 is applied to the noninverting input of an operational amplifier 220, which operates in a nonlinear mode. As a result, the output of the amplifier 220 is low for an input higher than the bias point of amplifier 212 and is high for an input lower than the bias point. Resistors 222, 224 and 226 act as a voltage divider to set the switch point of the amplifier 220. Capacitor 228 acts as an AC ground so that the gain of the amplifier 220 is the ratio of resistor 222 to resistor 224. Capacitor 230 merely acts as a filter to prevent coupling from one portion of the circuit to another. The output of amplifier 220 is thus a digital signal corresponding to the modulation of the RF signal received by the antenna 34. It is, in fact, identical to the digital signal at the output of encoder 154 (FIG. 6).

The digital signal at the output of amplifier 220 is applied to a conventional decoder circuit 230 through resistor 232. The decoder circuit 230 is a conventional encoder/decoder circuit available from National Semiconductor. In its decoding mode, it examines the signal applied to its input to determine the duration of each bit of the incoming waveform. The time base for the measurement is set by resistor 234 and capacitor 236. Whether each bit is considered valid is determined by the position of the corresponding decoding switch 38.

After four eight-bit sets of the incoming signal have been found to be valid, the decoder 230 generates a negative-going output which is applied to the one-shot 40 through diode 238. It will be remembered that when the transmitter unit is calling for the heating or cooling device to be energized, it generates the coded RF signal for one second every thirty seconds. Under these circumstances, the output of the decoder 230 can be expected to go low every thirty seconds. This low is applied to the timer 40, which consists of a conventional timing circuit 240, timing resistor 242, and timing capacitor 244. In operation, a low applied to the diode 238 discharges capacitor 244 and causes the output of timer 240 to go high. Thereafter, because of the high at the trigger input of the circuit 240, capacitor 244 charges through resistor 242 after the output of decoder 230 has gone high. The control voltage CON VOL input to the timer 240 receives a reference voltage from potentiometer 246 through resistor 248. When the capacitor 244 has charged to the reference voltage determined by potentiometer 246, the output of circuit 240 once again goes low.

The diode 238 also isolates the output of the decoder 230 from capacitor 244 when the output of the decoder 230 goes high. Otherwise, the output 230 would quickly charge the capacitor 244 to the voltage level so that the capacitor 244 would never be charged through resistor 242, and the timing circuit 240 would lose its timing function.

In the embodiment illustrated in FIG. 5, the potentiometer 246 is set so that it requires about fifty-five seconds for capacitor 244 to charge to the reference voltage. Thus, in operation, the timer circuit 240 would generate a high output for fifty-five seconds after being triggered. However, since the timer circuit 240 is triggered every thirty seconds, the output of the timer 240 remains high when the transmitter unit is calling for the heating or cooling device to be energized.

The power interface and shunting switch 42, as explained above, receives power from the AC signal on the control loop terminals 44,46 while shunting these terminals to energize the heating or cooling unit. Assuming that the transmitter unit is not calling for the device to be energized so that the output timer circuit 240 is low, light-emitting diode 250 is back-biased, thereby causing transistor 252 to be at cutoff. Under these circumstances, resistor 254 reverse biases transistor 256 during a positive cycle of the AC cycle, which is applied through diode 258. During the negative cycle of the AC signal at the terminals 44,46, diode 258 isolates the circuitry from the terminals 44,46. Insofar as transistor 256 is then held at cutoff, transistor 260 is also at cutoff. Under these circumstances, capacitor 262 charges to the peak value of the AC signal through resistor 264. It is important that resistor 264 have substantial impedance so that the circuit does not allow enough current to flow in the control loop to close the relay which energizes the heating or cooling device. The positive voltage on capacitor 262 is applied to a conventional voltage regulator 266, which then generates a relatively constant output. Zener diode 268 could be used to regulate the voltage applied to the input of the regulator 266. However, in the embodiment of FIG. 5, it is provided merely to protect the regulator 266 from relatively high-voltage transients.

The relatively constant voltage at the output of the voltage regulator 266 is applied to a pair of voltage divider resistors 270,272 which establish a reference voltage at the negative input of comparator 274. In a like manner, the voltage across capacitor 262 is applied to a pair of voltage divider resistors 276,278. However, the low voltage at the output of timing circuit 240 holds the junction between resistors 276,278 low through diode 280. The negative input to the comparator 274 is thus significantly larger than the positive input, thereby causing the comparator 274 to generate a negative output which back-biases switching transistor 282. Transistor 282, being at cutoff, cannot trigger a Triac 284 through resistor 286, which, as explained hereinafter, is used to shunt the terminals 44,46. Thus, when the output of timer circuit 240 is low (i.e., the transmitter unit is not calling for the heating or cooling device to be energized), switching transistors 256,260 are at cutoff and shunting Triac 284 cannot be triggered. During this time, capacitor 262 is charged by the AC signal at terminals 44,46 through diode 258 and resistor 264 in order to supply power to the receiver unit 30.

When the transmitter unit 10 calls for the heating or cooling unit to be energized, the output of the timing circuit 240 normally remains high. This high forward biases light-emitting diode 250 and saturates transistor 252 through resistor 290. Transistor 252 then draws current during the positive cycle of the AC signal through diode 258, resistor 254, and resistor 292. The voltage drop across resistor 254 forward biases the base emitter junctions of transistor 256,260, causing these transistors to conduct. The cathode of diode 258 is then effectively connected to capacitor 262 so that 262 quickly charges.

It will be remembered that the voltage across capacitor 262 is applied to voltage divider resistors 276, 278. Insofar as the high at the output of timing circuit 240 now back-biases diode 280, a sample of the voltage across capacitor 262 is applied to the positive input of comparator 274. As the voltage on capacitor 262 continues to increase during the positive cycle of the AC signal, the voltage applied to the positive input of comparator 274 ultimately exceeds the reference voltage applied to the negative input of comparator 274. The output of comparator 274 then goes positive, thus saturating transistor 282 and applying a trigger voltage to Triac 284 through resistor 286. The Triac 284 remains in a conductive state during the entire positive cycle of the AC signal. However, the Triac 284 would normally become nonconductive during the negative cycle of the AC waveform unless it were once again triggered. This retriggering function is accomplished by applying a portion of the negative-going AC signal to the negative input of comparator 274 so that it once again generates a positive triggering signal. More specifically, the AC waveform across terminals 44,46 is applied to a pair of parallel, reverse connected diodes 300,302 through resistor 304. A signal that is substantially a square wave having an amplitude of between about −0.7 volt and +0.7 volt is thus produced across diodes 300,302. This square wave is coupled to the negative input of comparator 274 through capacitor 306. At the start of the negative cycle of the AC waveform, the voltage at the positive input of comparator 274 is approximately equal to the reference voltage at the negative input, assuming that capacitor 262 has not discharged significantly during the positive cycle. The trailing edge of the square wave coupled through capacitor 306 at the start of the negative cycle thus reduces the reference voltage at the negative input to comparator 274 below the voltage on the positive input, thus causing the comparator 274 to trigger the SCR 284. The SCR 284 then remains conductive throughout the entire remainder of the negative cycle of the AC signal.

When power is initially applied to the circuit, its operating condition is not well defined. Consequently, it is desirable to prevent the circuit from energizing the heating or cooling device until steady-state conditions have been reached. Accordingly, when power is initially applied to the circuit, the output of the voltage regulator 266 is through capacitor 310, effectively placing resistors 270 and 312 in parallel. The voltage at the inverting input to amplifier 274 is then increased for a short period to prevent amplifier 274 from triggering the Triac 284. Capacitor 310 then charges to the reference voltage through resistors 270, 312.

The current drain of the circuitry is sufficiently low that the capacitor 262 does not discharge appreciably during each cycle of the AC signal. Consequently, it is necessary for the capacitor 262 to be connected to the terminal 44 through diode 258 for only a very short period during the initial portion of the positive cycle. Thereafter, the terminals 44,46 are shunted by the Triac 284. The power interface and shunting switch 42 thus provides power to the circuitry at a substantial voltage while effectively shunting the terminals 44,46. The circuit thus receives power from the AC control loop even while the heating or cooling device is energized. As indicated above, this has not been possible in the past since the shunted AC terminals are conventionally throught of as being incapable of supplying power of substantial voltage. It is this feature which allows the circuit to be powered by the AC control loop even if the heating or cooling device is energized for a relatively high percentage of the time. Furthermore, the low duty cycle of the transmitter ensures a relatively long lifetime for the battery 26 powering the transmitter.

We claim:

1. A system for operating an environmental control unit which regulates an environmental condition at a remote location, comprising:

a transmitter unit placed at said remote location, said unit including:
(1) environmental-sensing means for sensing the value of said environmental condition;
(2) comparator means for comparing the value of said environmental condition to a preset value and for producing an actuating signal responsive to a predetermined difference therebetween;
(3) a radio transmitter actuated by said actuating signal, thereby generating an RF signal in accordance with said environmental condition; and a receiver unit connected to said environmental control unit, said receiver unit generating an output which energizes said environmental control unit responsive to receipt of said RF signal, said environmental control unit being actuated by placing a relatively low impedance between a pair of terminals across which an AC signal is present and wherein said receiver unit includes a circuit for selectively applying a low impedance between said terminals responsive to the receipt of said RF signal while applying power to said receiver unit from the AC signal across said terminals, said circuit comprising:

an energy storage device applying electrical power to said receiver unit while discharging and storing energy while charging;

a rectifier connected to said energy storage device, said rectifier charging said energy storage device with DC power upon receipt of said AC signal while disconnecting said energy storage device when the magnitude of said AC voltage is less than the voltage from said energy storage device;

a first normally open switch selectively being closed to apply said AC signal to said receiver;

a second normally open switch connected across said terminals, said switch being selectively closed to place a low impedance between said terminals; and control means effective upon receipt of said RF signal by said receiver to close said first switch and open said second switch during a predetermined portion of each AC cycle and to close said second switch during the remainder of said AC cycle, said predetermined portion constituting a relatively small portion of said AC cycle so that the average impedance between said terminals is relatively low.

2. The system of claim 1 wherein said transmitter generates an RF signal that is modulated by a code, and said receiver includes demodulating and decoding means for detecting said code and for generating said output only upon receipt of an RF signal modulated with said code.

3. The system of claim 1 wherein said transmitter unit includes first timing means triggered by the actuating signal of said comparator means for periodically generating an output pulse, said radio transmitter being actuated by said output pulse so that said transmitter periodically generates said RF signal responsive to receipt of the actuating signal from said comparator means, and wherein said receiver means include second timing means triggered by the output of said receiver unit for energizing said environmental control unit for a period that is longer than the interval between said output pulse such that said second timing means continuously energizes said environmental control unit as long as said transmitter periodically generates said RF signal.

4. The system of claim 1, further including a relatively high-impedance circuit element shunting said first switch to apply power to the said energy storage device when said first and second switches are open.

5. A system for operating an environmental control unit which regulates an environmental condition at a remote location, comprising:

a transmitter unit placed at said remote location, said unit including:
(1) environmental-sensing means for sensing the value of said environmental condition;
(2) comparator means for comparing the value of said environmental condition to a preset value and for producing an actuating signal responsive to a predetermined difference therebetween;
(3) a radio transmitter actuated by said actuating signal, thereby generating an RF signal in accordance with said environmental condition; and a receiver unit connected to said environmental control unit, said receiver unit generating an output which energizes said environmental control unit responsive to receipt of said RF signal, said environmental control unit being actuated by placing a relatively low impedance between a pair of terminals across which an AC signal is present, wherein a thermostat is connected between said terminals to actuate said environmental control device, and wherein said receiver unit includes a circuit for selectively applying a low impedance in series with said thermostat responsive to the receipt of said RF signal while otherwise applying a high impedance in series with said thermostat so that said thermostat acts as a backup to deactuate said environmental control device at the set point of said thermostat.

6. The system of claim 5 wherein said control means includes voltage-sensing means for measuring the energy stored in said energy storage device and for closing said first switch and opening said second switch at a predetermined point during each AC cycle, thereby storing energy in said energy storage device, and for closing said second switch when the energy stored in said energy storage device reaches a predetermined value.

7. The system of claim 6 wherein said energy storage device is a capacitor and said rectifier is a diode connected in series with said capacitor, said first switch and said terminals, and wherein said control means comprise a comparator having a pair of inputs, one of which receives a fixed reference voltage and the other of which samples the voltage across said capacitor so that the output of said comparator is a first polarity during the initial portion of each AC cycle until said capacitor has charged to a voltage causing the sample to exceed said reference voltage, thereby switching the polarity at the output of said comparator to a second polarity, said comparator being effective to open said second switch when the output of said comparator is said first polarity and to close said second switch when the output of said comparator is said second polarity.

8. The system of claim 7 wherein said rectifier is connected to apply a positive voltage to said comparator and wherein said second switch is a Triac, which, once triggered, remains conductive until the current flow therethrough falls to a predetermined value, said Triac being triggered by the output of said comparator switching from said first polarity to said second polarity to cause said Triac to conduct when said capacitor has been charged to a voltage causing said sample to equal said reference voltage.

9. The system of claim 8, further including means for triggering said Triac during the negative cycle of said AC signal comprising a circuit element coupling a portion of said AC signal to the input of said comparator that receives said reference voltage such that during the initial part of the negative cycle of said AC signal, the voltage applied to such input is reduced below said sample, thereby causing said comparator to switch from said first polarity to said second polarity.

10. A temperature control system for regulating the temperature in an area which is heated or cooled by a remotely located heating or cooling unit, said heating or cooling unit being energized by placing a relatively low impedance between a pair of terminals between which an AC signal is present, said system comprising:

a transmitter unit placed in said area, said unit including:
(1) a temperature sensor,
(2) a comparator generating an actuating signal when the sensed temperature is lower than a preset temperature in a heating mode and generating said actuating signal when the sensed temperature is higher than said preset temperature in a cooling mode, and
(3) a radio transmitter energized by said actuating signal to generate an RF signal; and a receiver unit including:

(1) a radio receiver generating an actuating signal responsive to receipt of the RF signal generated by said radio transmitter, (2) an energy storage device applying power to said receiver unit while discharging and storing energy while charging, (3) a rectifier connected to said energy storage device, said rectifier charging said energy storage device with DC power upon receipt of said AC signal while disconnecting said energy storage device when the magnitude of said AC voltage is less than the voltage from said energy storage device, (4) a first normally open switch selectively being closed to complete a circuit through said terminals and rectifier, (5) a second normally open switch connected across said terminals, said switch being selectively closed to place a low impedance between said terminals, (6) a comparator having a pair of inputs, one of which receives a fixed reference voltage and the other of which receives a voltage representing a sample of the voltage across said capacitor so that the output of said comparator is a first polarity during the initial portion of each AC cycle until said capacitor is charged to a voltage causing said sample to exceed said reference voltage and is then switched to a second polarity, said comparator being effective to open said second switch when the output of said comparator is said first polarity and to close said second switch when the output of said comparator is said second polarity, and (7) a relatively high-impedance circuit element shunting said first switch to apply power to said energy storage device when said first and second switches are open.

11. The temperature control system of claim 10 wherein said radio transmitter is energized in a predetermined pattern so that said transmitter generates a series of pulses of said RF signal arranged in said predetermined pattern and wherein said radio receiver receives and demodulates said pulses of said RF signal, thereby generating a pulse train of said predetermined pattern, said receiver unit further including decoding means receiving said pulse train for generating said actuating signal only upon recognizing a pulse train of said predetermined pattern.

12. The temperature control system of claim 10 wherein said transmitter unit includes first timing means triggered by the actuating signal of said comparator for periodically generating an output pulse, said radio transmitter being actuated by said output pulse so that the transmitter periodically generates said RF signal responsive to receipt of the actuating signal from said comparator, and wherein said radio receiver includes second timing means triggered by the output of said receiver unit for actuating said heating or cooling device for a period that is longer than the interval between said output pulses such that said second timing means continuously energizes said heating or cooling unit as long as said transmitter periodically generates said RF signal.

13. A circuit for controlling the operation of and being powered by an environmental control device that is energized by placing a relatively low impedance between a pair of terminals between which an AC signal is present, said circuit comprising:

an energy storage device applying power to said circuit while discharging and storing energy while charging;

a rectifier connected to said energy storage device, said rectifier charging said energy storage device with DC power upon receipt of said AC signal while disconnecting said energy storage device when the magnitude of said AC voltage is less than the voltage from said energy storage device;

a first normally open switch selectively being closed to complete a circuit from said terminals through said rectifier;

a second normally open switch connected across said terminals, said switch being selectively closed to place a low impedance between said terminals; and control means effective upon receiving an actuating signal to close said first switch and open said second switch during a predetermined portion of each AC cycle and to close said second switch during the remainder of each AC cycle, said predetermined portion constituting a relatively small portion of said AC cycle so that the average impedance between said terminals is relatively low.

14. The circuit of claim 13 wherein said control means includes voltage-sensing means for measuring the energy stored in said energy storage device and for opening said second switch at a predetermined point during each AC cycle, thereby storing energy in said energy storage device, and for closing said second switch when the energy stored in said energy storage device reaches a predetermined value.

15. The circuit of claim 14 wherein the energy storage device is a capacitor and said rectifier is a diode connected in series with said capacitor, said first switch and said terminals, and wherein said control means comprise a comparator having a pair of inputs, one of which receives a fixed reference voltage and the other of which samples the voltage across said capacitor so that the output of said comparator is a first polarity during the initial portion of each AC cycle until said capacitor has charged to a voltage causing the sample to exceed said reference voltage, thereby switching the polarity at the output of said comparator to a second polarity, said comparator being effective to open said second switch when the output of said comparator is said first polarity and to close said second switch when the output of said comparator is said second polarity.

16. The circuit of claim 15 wherein said rectifier is connected to apply a positive voltage to said comparator and wherein said second switch is a Triac, which, once triggered, remains conductive until the current flow therethrough falls to a predetermined value, said Triac being triggered by the output of said comparator switching from said first polarity to said second polarity to cause said Triac to conduct when said capacitor has been charged to a voltage causing said sample to equal said reference voltage.

17. The circuit of claim 16, further including means for triggering said Triac during the negative cycle of said AC signal comprising a circuit element coupling a portion of said AC signal to the input of said comparator that receives said reference voltage such that during the initial part of the negative cycle of said AC signal, the voltage applied to such input is reduced below said sample, thereby causing said comparator to switch from said first polarity to said second polarity.

18. The circuit of claim 13, further including a relatively high-impedance circuit element shunting said first switch to apply power to the said energy storage device when said first and second switches are open.

19. The circuit of claim 13 wherein said circuit is connected between said terminals in series with a thermostat so that said thermostat acts as a backup to deactuate said environmental control device at the set point of said thermostat.

* * * * *